United States Patent
Delattre et al.

(10) Patent No.: US 9,800,865 B2
(45) Date of Patent: Oct. 24, 2017

(54) DEVICE AND METHOD FOR MANAGING THE POSITION OF THE FOCAL PLANE IN A STEREOSCOPIC SCENE

(75) Inventors: Alexandre Delattre, Viroflay (FR); Jerome Larrieu, Hasparren (FR)

(73) Assignee: NINTENDO EUROPEAN RESEARCH AND DEVELOPMENT SAS, Paris (FR)

( * ) Notice: Subject to any disclaimer, the term of this patent is extended or adjusted under 35 U.S.C. 154(b) by 401 days.

(21) Appl. No.: 14/000,462

(22) PCT Filed: Feb. 21, 2012

(86) PCT No.: PCT/EP2012/052943
§ 371 (c)(1),
(2), (4) Date: Nov. 18, 2013

(87) PCT Pub. No.: WO2012/113797
PCT Pub. Date: Aug. 30, 2012

(65) Prior Publication Data
US 2014/0055581 A1    Feb. 27, 2014

(30) Foreign Application Priority Data
Feb. 23, 2011   (FR) .................................... 11/51467

(51) Int. Cl.
*H04N 13/04*   (2006.01)
*H04N 13/00*   (2006.01)
(Continued)

(52) U.S. Cl.
CPC ......... *H04N 13/0497* (2013.01); *G06T 7/593* (2017.01); *G06T 7/97* (2017.01);
(Continued)

(58) Field of Classification Search
CPC ............ H04N 13/0497; H04N 13/0007; G06T 7/0022; G06T 7/0075
See application file for complete search history.

(56) References Cited

U.S. PATENT DOCUMENTS 6,163,337 A * 12/2000 Azuma ................. G06T 7/0022
348/43
2004/0114218 A1   6/2004 Karlsson et al.
(Continued)

FOREIGN PATENT DOCUMENTS

EP   1 884 893   2/2008
EP   2 280 555   2/2011
(Continued)

OTHER PUBLICATIONS

Bimber et al., "Enabling View-Dependent Stereoscopic Projection in Real Environments," Proceedings of the International Symposium on Mixed and Augmented Reality, IEEE, 2005.*
(Continued)

*Primary Examiner* — Thai Tran
*Assistant Examiner* — Christopher T Braniff
(74) *Attorney, Agent, or Firm* — Nixon & Vanderhye PC

(57) ABSTRACT

The present invention concerns the field of stereoscopic vision systems and more particularly the management of the position of the focal plane in a stereoscopic scene. The invention aims to propose a method for managing the focal plane within a stereoscopic image or a sequence of stereoscopic images. A translation of the right and left images is effected in order to place the focal plane in front of the scene viewed. Advantageously, the depth of the major objects of the scene is estimated by a division of the images into a plurality of zones and estimation of the depth of each of the zones. The depth of the focal plane is then calculated so that most of the scene is behind the focal plane.

5 Claims, 3 Drawing Sheets

(51) Int. Cl.
*G06T 7/00* (2017.01)
*G06T 7/593* (2017.01)

(52) U.S. Cl.
CPC ..... *H04N 13/0007* (2013.01); *H04N 13/0022* (2013.01); *G06T 2207/10012* (2013.01); *G06T 2207/20068* (2013.01)

(56) References Cited

U.S. PATENT DOCUMENTS

| | | |
|---|---|---|
| 2007/0047040 A1 | 3/2007 | Ha |
| 2012/0038641 A1* | 2/2012 | Levantovsky ....... H04N 13/004 345/424 |

FOREIGN PATENT DOCUMENTS

| | | |
|---|---|---|
| EP | 2280555 A2 * | 2/2011 |
| JP | 09-084014 | 3/1997 |
| JP | A-2003-294143 | 10/2003 |
| WO | WO 99/44369 | 9/1999 |

OTHER PUBLICATIONS

International Search Report for PCT/EP2012/052943, mailed Jun. 4, 2012.
Foreign-language Written Opinion of the International Searching Authority for PCT/EP2012/052943, mailed Jun. 4, 2013.
English-language translation of Written Opinion of the International Searching Authority for PCT/EP2012/052943, mailed Sep. 6, 2013.
Translated Japanese Office Action mailed Oct. 20, 2015 for Japanese Patent Application No. 2013-554871.

* cited by examiner

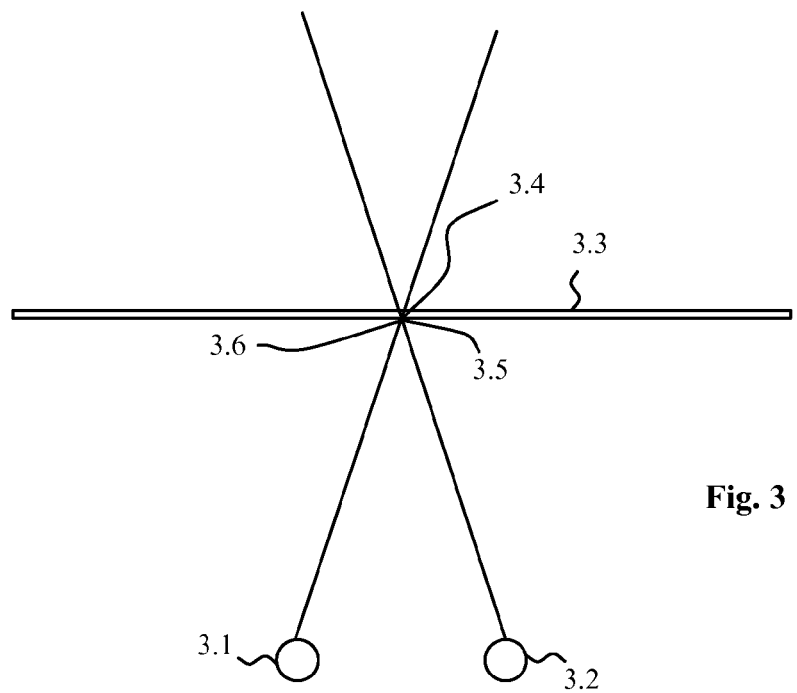
Fig. 3
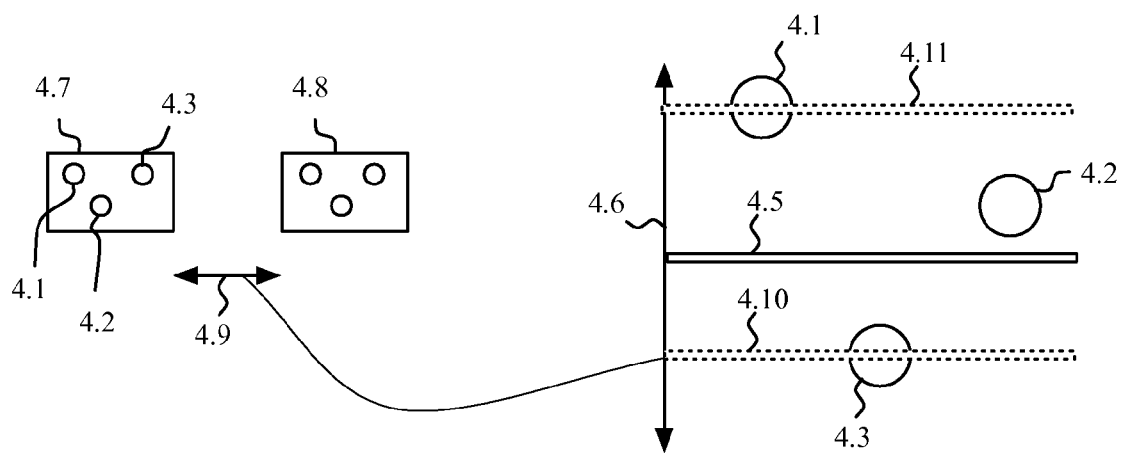
Fig. 4
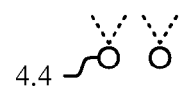

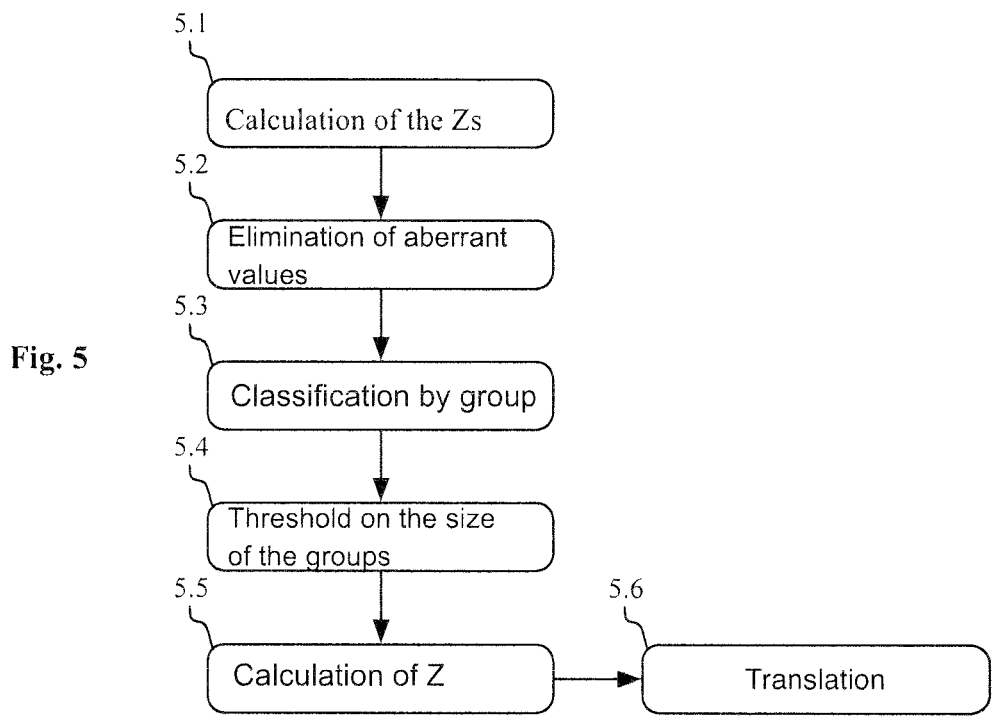
Fig. 5
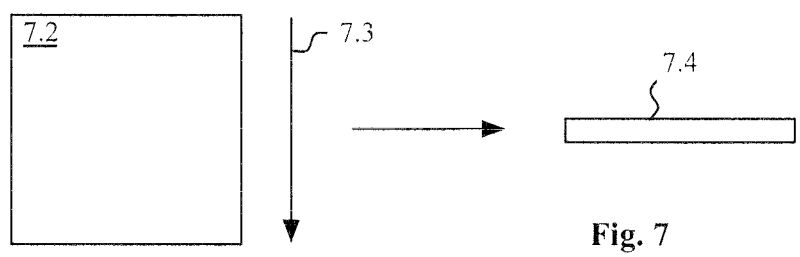
Fig. 6
Fig. 7

DEVICE AND METHOD FOR MANAGING THE POSITION OF THE FOCAL PLANE IN A STEREOSCOPIC SCENE

This application is the U.S. national phase of International Application No. PCT/EP2012/052943, filed 21 Feb. 2012, which designated the U.S. and claims priority to FR Application No. 11/51467, filed 23 Feb. 2011, the entire contents of each of which are hereby incorporated by reference.

The present invention concerns the field of stereoscopic vision systems and more particularly the management of the position of the focal plane in a stereoscopic scene.

Stereoscopic images are typically composed of a left image and a right image of the same scene. These two images are taken by cameras from a slightly offset point of view. Generally, the two cameras are parallel and spaced apart by a few centimetres. A stereoscopic video is composed of two video streams, a left-hand video stream and a right-hand video stream.

The stereoscopy is due to the parallax effect. This effect results in the fact that the same object appears in the two images, left and right, slightly translated. The extent of the translation depends on the depth, that is to say the distance to the cameras, of the object.

In the example in FIG. 1, an object is viewed on a stereoscopic screen 1.3. The eyes 1.1 and 1.2 of the user are depicted. The object is situated on the left-hand image at point 1.6 and on the right-hand image at point 1.5. These points are distant by a translation value 1.7; this value expressed in translation in the right-hand image with respect to the left-hand image is a negative translation. When the eyes of the user accommodate to view this point, it appears at point 1.4 as being situated in front of the screen.

In the example in FIG. 2, an object is displayed on a stereoscopic screen 2.3. The eyes 2.1 and 2.2 of the user are shown. The object is situated on the left-hand image at point 2.6 and on the right-hand image at point 2.5. These points are distant by a translation value 2.7; this value expressed in translation in the right-hand image with respect to the left-hand image is a positive translation. When the eyes of the user accommodate to view this point, it will appear at point 2.4 as being situated behind the screen.

In the example in FIG. 3, an object is viewed on a stereoscopic screen 3.3. The eyes 3.1 and 3.2 of the user are shown. The object is situated on the left-hand image at point 3.6 and on the right-hand image at point 3.5. These points are merged; the translation for this point is zero between the two images. When the eyes of the user accommodate to view this point, it will appear at point 3.4 as being situated level with the screen.

These figures illustrate the fact that the points that are superimposed in the left and right images appear on the screen. The objects subject to a negative translation value, or negative parallax, appear in front of the screen. The objects subject to a positive translation value, or negative parallax, appear in front of the screen. The objects subject to a positive translation value, or positive parallax, appear behind the screen. The parallax value depends directly on the depth of the object in the scene captured.

The focal plane of a stereoscopic scene means the plane perpendicular to the optical axes of the camera situated at a given depth such that all the points representing objects in this plane are represented in the left and right images with a zero parallax.

The optical axes of the cameras effecting the stereoscopic photography being typically parallel, objects at infinity are superimposed perfectly in the two images while closer objects undergo a translation that is the greater, the closer the objects to the cameras. The images taken by such a system therefore have a focal plane at infinity. When they are projected on a screen, the whole of the scene is situated in front of this screen. It is found that viewing a stereoscopic video where the focal plane is thus situated at infinity tends to be uncomfortable to the eye. A focal plane situated overall in front of the scene with rare objects that may be situated in front of the focal plane is much more comfortable to view.

The invention aims to propose a method for managing a focal plane in a stereoscopic image or sequence of stereoscopic images. A translation of the right and left images is effected in order to place the focal plane in front of the scene viewed. Advantageously, the depth of the major objects in the scene is estimated by dividing the images into a plurality of zones and estimating the depth of each of the zones. The depth of the focal plane is then calculated so that most of the scene is behind the focal plane.

The invention concerns a method for managing the position of the focal plane in a stereoscopic scene represented by a left-hand image and a right-hand image that comprises a step of determining at least one zone in the two images; a step of calculating the dominant translation value for each of the zones; a step of determining a relative translation value between the left and right images according to the dominant translation values of each of the zones and a step of relative translation of the two left and right images of said previously determined value.

According to a particular embodiment of the invention, the step of calculating the dominant translation value for each of the zones comprises a step of projecting the left-hand zone and the right-hand zone onto a left-hand line and a right-hand line; a step of calculating the correlation between the left-hand line and the right-hand line for several translation values and a step of determining the translation value for which the correlation is the best.

According to a particular embodiment of the invention, the step of determining a relative translation value between the left and right images comprises a step of classifying the dominant translation values of each zone by a group of close values; a step of calculating the mean value of the dominant translation values in each group and a step of choosing the highest mean value that corresponds to the closest group, as the relative translation value between the left and right images.

According to a particular embodiment of the invention, the method furthermore comprises a step of eliminating these zones for which the dominant translation value obtained is aberrant.

According to a particular embodiment of the invention, the method also comprises a step of eliminating the groups of zones that do not contain a number of zones at least equal to a given threshold.

The invention also concerns a stereoscopic photography or viewing device characterised in that it comprises means for managing the position of the focal plane in a stereoscopic scene represented by a left-hand image and right-hand image comprising means for determining at least one zone in the two images; means for calculating the dominant translation value for each of the zones; means for determining a relative translation value between the left and right images according to the dominant translation values of each of the zones and means for effecting a relative translation of the two left and right images of said previously determined value.

The features of the invention mentioned above, as well as others, will emerge more clearly from a reading of the following description of an example embodiment, said description being given in relation to the accompanying drawings, among which:

FIG. 3 illustrates the positions of a point appearing in the focal plane.

FIG. 4 illustrates the method for moving the focal plane in the example embodiment of the invention.

FIG. 5 illustrates an example embodiment of the method for managing the focal plane.

FIG. 6 illustrates a division of an image by zones.

FIG. 7 illustrates the projection of a zone onto a line.

Figure 1:
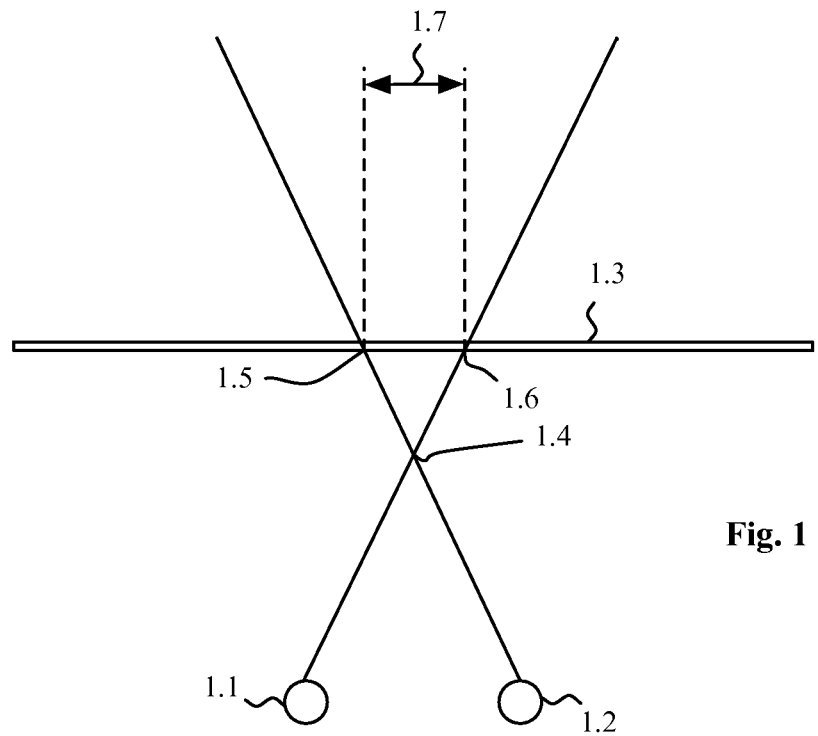
FIG. 1 illustrates the positions of a point appearing behind the focal plane.
Figure 2:
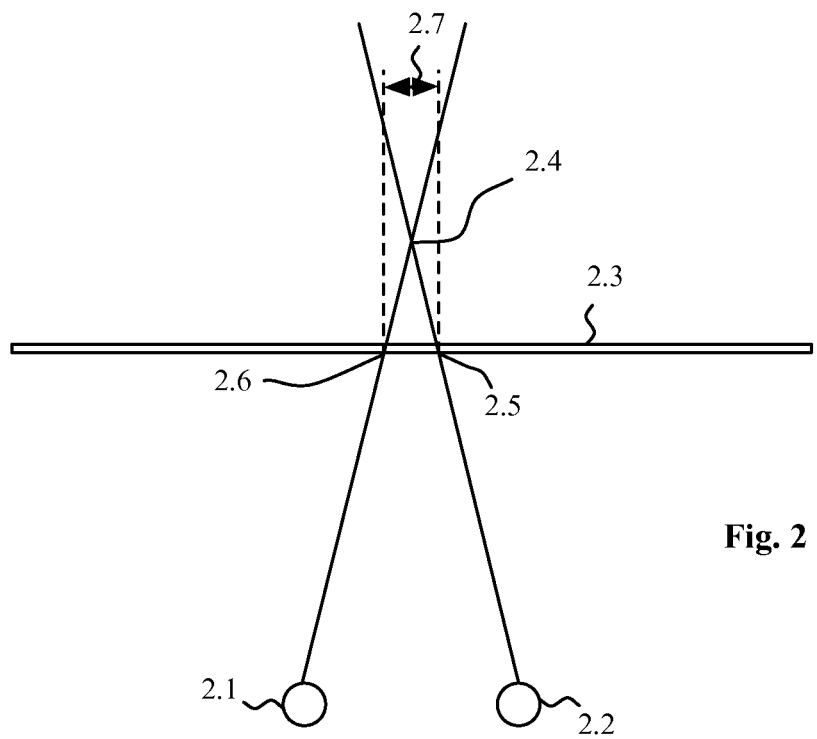
FIG. 2 illustrates the positions of a point appearing in front of the focal plane.

FIG. 4 illustrates the method for moving the focal plane. A scene comprises objects 4.1, 4.2 and 4.3 each situated at a given depth as viewed by an observer 4.4. The scene is displayed on a screen 4.5. For the observer 4.4, the focal plane of a scene coincides with the screen. The objects appear in front of the screen or behind the screen if they are situated in front of the focal plane or behind the focal plane.

The scene is created from a left-hand image 4.7 and a right-hand image 4.8, which each represent the scene and its objects. We have seen that the focal plane corresponds to the objects the locations of which in the left and right images are superimposed. The objects outside the focal plane are subject to parallax, negative for the objects in front of the focal plane and positive for the objects behind the focal plane.

If it wished for the focal plane to be situated level with the object 4.3, for example, it suffices to effect a relative translation of the left and right images for the object 4.3 to be superimposed in the two images. The focal plane then comes into the position 4.10. Likewise, if it is wished for the focal plane to be situated level with the object 4.1, for example, it suffices to effect a relative translation of the left and right images for the object 4.1 to be superimposed in the two images. The focal plane then comes into the position 4.11.

It is therefore found that it is possible to act on the depth 4.6 of the focal plane by effecting relative translations 4.9 between the left and right images of the scene.

When shooting, the cameras have a parallel optical axis. Because of this, the left and right images are superimposed for objects at infinity. When such scenes are displayed on the screen the whole of the scene therefore appears in front of the focal plane and therefore as "emerging" from the screen. Viewing then requires constant adjustments of the accommodation in a zone close to the eyes and proves to be uncomfortable.

It is therefore advantageous to move the focal plane of the images of a stereoscopic sequence in order to make the scene "move back". It can be shown that the sequence is comfortable to view when most of the scene is situated behind the screen and only rare objects come to pass in front of the screen.

To do this, it is therefore necessary to calculate the relative translation value that it is necessary to apply to the left and right images in order to move the focal plane and position it at a given depth. This depth is calculated according to a measurement of the depths of the objects present in the scene. When these depths have been measured, a depth is determined such that most of the scene is situated behind the focal plane. It is considered that this is the case for example when more than 50% of the surface of the images appears to be situated behind the focal plane.

Advantageously, it is not necessary to actually calculate the depths. The depth being related to the amount of parallax and therefore to the amount of translation, it is merely necessary to calculate the translation values for the various objects of the scene and to apply a relative translation value to the images calculated according to these translation values for the objects.

Several policies for managing the focal plane can be adopted here. According to a first example embodiment, it is sought to place the focal plane so that most of the scene is behind the focal plane.

An example embodiment of the method for managing the focal plane according to this first embodiment is illustrated by FIG. 5. During a first step 5.1, at least one zone is determined in the left and right images. This is because, according to some embodiments, the whole of the image is analysed or an area of interest in the image is concentrated on, typically a central zone. According to other embodiments, the images are divided into a plurality of zones. The dominant translation values, referred to as Z, of each of the zones of the image are calculated. The division can be done, for example, according to the method illustrated by FIG. 6. In the example embodiment, an image 6.1 is divided into a set of zones 6.2 here determined by an equal division into 9 zones.

Each zone is projected onto a line according to the diagram in FIG. 7. A zone 7.2 or each column is added according to the operation 7.3 in order to give a single line 7.4. In this way a line is obtained that represents the zone along the horizontal axis.

It is then sought to determine the dominant parallax on the zone by a correlation of the left-hand line obtained for the zone in the left-hand image with the right-hand line obtained for the zone in the right-hand image. The correlation is done by adding the absolute values of the differences for each tested translation value of said lines. In this way the horizontal translation for which the correlation is best is determined and the dominant translation X for the zone is derived therefrom.

The correlation can be done by any other means, for example by adding the squares of the differences. Alternatively, a translation can also be determined by calculating the Fourier transform of the left and right lines, which is then divided member by member. The inverse Fourier transform is then calculated. The index of the maximum norm value in the sense of complex numbers then gives the optimum translation value.

Alternatively, the translation can also be determined by direct calculation of the parallaxes in two dimensions, for example by comparing sub-blocks of the image, that is to say without prior projection of the images onto lines. This method is naturally more precise but slower.

Making the correlation on the projection of each zone onto a line affords a gain in terms of calculation time compared with the correlation done on the whole of the zone. Because the translation that it is sought to measure is a solely horizontal translation, the result is reliable. This is particularly important when the method is applied in real time during the retrieval of the scene on an apparatus having a limited computing resource.

During a step 5.2, the zones for which the dominant translation value obtained is aberrant are advantageously eliminated, if such exist. That is to say excessively small or excessively large values or ones that are excessively different from the other values obtained. This step is optional.

During a step 5.3, the translation values obtained are grouped together in groups of close values. The idea is here to group the zones of the image representing objects that are close in terms of depth.

Advantageously, in order to take account only of groups corresponding to zones of significant size and image, a threshold on the minimum size of a group in terms of number of zones is fixed during a step 5.4. Then only the groups having a minimum number of members are retained. For example, the groups consisting of a single element are eliminated. It is sought to divide the image into significant groups of depths. In this way the objects of a certain size on the screen are concentrated on.

This knowledge of the translations relative to the various significant objects of the image is then used to place the focal plane. According to the example embodiment, during step 5.5, the averages of the various dominant translation values obtained for each zone are calculated. The strongest average value that corresponds to the closest significant group is then chosen. In this way, the focal plane is placed in front of the scene. It is always possible that certain objects, for example eliminated during the thresholding operation 5.4, or too small to appreciably influence the translation of a given zone, are situated in front of the focal plane. However, most of the scene is thus positioned behind the focal plane.

During step 5.6, the relative translation is then effected between the left and right images in order to effectively place the focal plane at the given depth. This translation can be done on the right-hand image with respect to the left-hand image or on the left-hand image with respect to the right-hand image. It is also possible to distribute the translation over the two images.

According to another embodiment, it is sought to place the main object of the scene at the focal plane. To do this, for example, a single zone in the image is defined, typically a central zone. Then as before the depth of the zone is calculated, or simply the corresponding translation, and it is applied to the images in order to place the focal plane at this zone. Alternatively, it is also possible to choose to place the focal plane at the depth level of the group having the most members in the algorithm described previously.

According to another embodiment, it is sought to place the far scene behind the focal plane in order to obtain a high level of visual comfort, especially if the screen is close to the eyes. In this case the minimum depth can be taken on all the zones, that is to say the maximum translation, or a value decreased by a given percentage of this minimum depth.

This method can be used on a fixed image consisting of a single left-hand image and a single right-hand image. It can also be used on a stereoscopic image sequence. In the latter case, it can be effected as a processing on the sequence outside the viewing process or be effected in real time during viewing or during shooting. The latter embodiment is particularly advantageous when it is integrated in a photography and stereoscopic retrieval apparatus. It is possible for example to integrate it in an apparatus such as a mobile telephone integrating a stereoscopic photography system, a portable game console or a stereoscopic camera.

The invention claimed is:
1. A method of managing the position of the focal plane in a stereoscopic scene represented by a left image and a right image, the method comprising the steps of:
   dividing the left image and the right image into a plurality of corresponding zones;
   calculating, for each divided zone, a dominant translation value of the zone of highest correlation between the left image and the right image;
   classifying the dominant translation values into groups of close dominant translation values;
   calculating, for each group, the average value of the dominant translation values of the zones constituting the group;
   determining a relative translation value between the left and right images equal to a highest average value amongst all the average values of the groups, and
   translating the left and right images according to the determined relative translation value to place the focal plane at the depth of the group having the highest average value.

2. A method according to claim 1, further comprising a step of removing zones for which the calculated dominant translation value is aberrant.

3. A method according to claim 1, further comprising the steps of:
   fixing a threshold of the minimum number of zones in a group; and
   removing the groups of zones that do not contain a number of zones equal to at least the fixed threshold.

4. A method according to claim 1, wherein the step of calculating the dominant translation value for each zone comprises the steps of:
   projecting a zone of the left image on a left line, and a zone of the right image on a right line;
   calculating the correlation between the left line and the right line for several translation values; and
   determining the translation value for which the correlation is the highest.

5. A shooting or stereoscopic display comprising cameras and a stereoscopic screen, characterized in that it is configured to carry out the steps of:
   dividing the left image and the right image into a plurality of corresponding zones;
   calculating, for each divided zone, a dominant translation value of the zone of highest correlation between the left image and the right image;
   classifying the dominant translation values into groups of close dominant translation values;
   calculating, for each group, the average value of the dominant translation values of the zones constituting the group;
   determining a relative translation value between the left and right images equal to a highest average value amongst all the average values of the groups, and
   translating the left and right images according to the determined relative translation value to place the focal plane at the depth of the group having the highest average value.

* * * * *